United States Patent
Wilson

[15] 3,663,268
[45] May 16, 1972

[54] PROCESS FOR ADHERING POLYESTER TIRE CORD TO RUBBER

[72] Inventor: Matthew W. Wilson, Stow, Ohio 44224
[73] Assignee: B. F. Goodrich Co., New York, N.Y.
[22] Filed: May 25, 1970
[21] Appl. No.: 40,381

[52] U.S. Cl..................117/76 T, 117/62.2, 117/138.8 F, 156/110 A, 156/335
[51] Int. Cl.........................................................B32b 27/36
[58] Field of Search..................117/62.2, 138.8 F, 80, 76 T; 156/335, 110 A

[56] References Cited

UNITED STATES PATENTS

| | | | |
|---|---|---|---|
| 3,190,764 | 6/1965 | Cardina | 117/62.2 |
| 3,282,724 | 11/1966 | Atwell | 117/62.2 |
| 2,961,343 | 11/1960 | Atwell | 117/76 T |
| 3,231,412 | 1/1966 | Pruitt et al. | 117/76 T |
| 3,437,610 | 4/1969 | Moult | 117/138.8 F X |
| 3,431,241 | 3/1969 | Moult et al. | 117/138.8 F X |
| 3,433,664 | 3/1969 | Osborne | 117/138.8 F X |

*Primary Examiner*—William D. Martin
*Assistant Examiner*—Ralph Husack
*Attorney*—Albert C. Doxsey and J. Hughes Powell, Jr.

[57] ABSTRACT

Synthetic textile tire cords, particularly polyester tire cords, are adhered to elastomeric tire stocks by a process involving (1) dipping the cords into a noncuring phenol-aldehyde liquid resin (2) heating to accomplish wetting of the outside filaments of the said cords with said resin, (3) dipping the cords into a resorcinol-formaldehyde-latex dip, (4) heating to dry the twice dipped cord and (5) heating the treated cord in contact with the desired elastomeric stock under pressure as the said stock is vulcanized.

6 Claims, No Drawings

PROCESS FOR ADHERING POLYESTER TIRE CORD TO RUBBER

BACKGROUND OF THE INVENTION

Certain rubber goods such as pneumatic tires, transmission belts and conveyor belts are subjected to severe service conditions. These articles are given increased strength by incorporating in them synthetic textile fibers, cords and fabrics. Polyamide (nylon), polyester (Dacron), rayon and glass based textiles can be used. Problems are encountered in adhering the textiles to elastomer stocks. Polyester fibers are desirable reinforcing materials for rubber because they offer good tensile strength, shock resistance, stretch resistance, dimensional stability, and bacterial resistance, but the molecular structure of polyester fibers is inactive and conventional adhesion treatments produce relatively poor adhesion of polyester fibers to rubber.

Fiber or cord reinforcements for rubber of any kind are typically adhered to the rubber by coating the fibers with and adhesive, imbedding them in or placing them in close contact with the rubber, and vulcanizing the rubber. When conventional adhesives and procedures are applied to polyester cord-rubber compositions, the polyester material tends to separate from the rubber at high loads of weight, flexing and temperature to cause propagation of tears in the rubber and general breakdown of the product.

Some success has been achieve in manufacture of pneumatic tires with polyester cord reinforcement by dipping the cords in solutions or dispersions of diisocyanates wherein the isocyanate groups are initially blocked from reaction, such reaction finally taking place upon the application of heat, and following this step with a dip in a standard resorcinol-formaldehyde-latex mixture and drying.

Another approach has been to blend polyvinyl pyridine with the polyester before spinning into filament and fiber form. Such cords are treated with known phenolic resins (formaldehyde:2,4-dihydroxybenzoic acid, for example). The resin is believed to react with polyvinyl pyridine in the blend. Final adhesion to rubber is accomplished by conventional means such as a dip in rubber latex containing resorcinol-formaldehyde resin, drying and cure with the rubber.

It has also been suggested to improve bondability of polyester cords to rubber by dipping them in fusible substances comprising molecular chains of aromatic groups X, Y, and Z which are connected by methylene groups attached to carbon atoms in the benzene rings, have end groups XH and ZH, a molecular weight of at least 300, and melting points in the range 10° to 300° C. and wherein X and Z are radicals such that HXH and HZH are resorcinol or substituted resorcinol and Y is a radical such that HYH is a substituted monohydroxybenzene such as orthochlorophenol. These fusible substances are used with known vulcanizable adhesive aids such as butadiene-styrene-vinyl pyridine latex mixed with resorcinol-formaldehyde condensate.

Industry prefers not to use systems employing diisocyanates which are toxic, expensive, and require a high degree of worker care. Water based systems are preferred to solvent based systems for similar reasons. Phenols containing halogen and the like substitution are more costly than unsubstituted phenols and it is always preferred to use lower cost materials when possible. An effective water based adhesive system for polyester cords and rubber stocks employing lower cost resins is still desired.

SUMMARY OF THE INVENTION

This invention provides for satisfactory adhesion of polyester cords to rubber stocks for tires and belts by use of water based systems and conventional resins. It provides a two dip and two heat process for preparing the cords. Standard, presently available equipment is used throughout. Cords are first coated in a noncuring phenolaldehyde resin, such as resorcinol-formaldehyde, wherein the molar ratio of phenol to aldehyde is that of $n + 1:n$, where $n$ is an integer from 1 to 7, such as 2:1, 3:2, and 4:3, or 5:4. The resins are noncuring because they are deficient in aldehyde content. Heat alone will not cure them. The dipped cords are heated to fuse the noncuring resin so that it will flow out and wet the polyester cord surfaces and apparently become activated for intermolecular attraction with the polyester. Next the cords are coated in a conventional resorcinol-formaldehyde-latex (RFL) dip system, one which is often used as the sole dip for nylon tire cords, when they are to be used as the textile reinforcement in a rubber stock. In this second dip the resorcinol-formaldehyde resin is one that will cure upon being heated because it is prepared with an excess of formaldehyde over resorcinol. This resin has methylol,—$CH_2$—OH, groups available on the ring structure which are derived from the formaldehyde and through which it cures. The resin used in the second dip also reacts through its methylol groups to cure the formaldehyde deficient resin applied during the first dip.

The cords are heated after the second dip to promote reaction of the RFL dip with the first deposited fused and uncured resorcinol-formaldehyde resin and of both resins with the cord. The resin layer of the first coat becomes cured at this point as does that of the second coat. From two to 10 parts of cured resin solids, preferably from four to five parts, are added to the cord per 100 parts by weight of cord. Conventional contact cure with a curing rubber stock then serves to bond the coated cords to the rubber to a degree which is highly satisfactory in the manufacture of pneumatic tires and other reinforced rubber articles.

DESCRIPTION OF THE INVENTION

Polyester cords are prepared from materials, a portion of which, at least, comprises a fiber-forming super polyester. The polyesters are high molecular weight polyesters obtained from alpha, omega-glycols and dicarboxylic acids, particularly polymethylene glycols and aromatic dicarboxylic acids. Polyethylene terephthalate, from ethylene glycol and terephthalic acid is a specific example. The cords employed may be reinforcing cords of any suitable size and construction such as 1600/2 and 2000/2 polyester and 840/2 nylon.

The noncuring phenol-aldehyde resins used for the first adhesive component on the cord are resins capable of being activated by means of a crosslinking agent to form an insoluble thermoset mass, but which otherwise are soluble in normal solvents and flexible as coatings. The preferred resins are those made by reacting an aldehyde with a resin-forming component such as a phenol, particularly a polyhydric phenol such as resorcinol. Particularly preferred are phenolic resins that are substantially soluble in water and are formed in the presence of a molar deficiency of aldehyde. A typical phenolic/aldehyde resin, deficient in aldehyde, is made by condensing the polyhydric phenol, such as resorcinol, with a molar deficient amount of an aldehyde, such as formaldehyde (1 to 1.8 moles of formaldehyde to 2 moles of resorcinol) by moderate heating in fairly concentrated aqueous solution until a ball and ring softening point of 214° – 235° F. is obtained. A catalyst such as oxalic acid may be used, but is not essential. The resin is soluble in ammonia water (25% $NH_4OH$), with which it may be diluted to provide the desired solids content. A material of this kind is commercially available as Koppers R–2170. This resin cures to an insoluble, infusible state when heated in the presence of additional formaldehyde (or a formaldehyde yielding agent). Suitable aldehydes include formaldehyde, acrolein, glyoxal, furfural, crotonaldehyde, aldol and benzaldehyde. Suitable phenols include resorcinol, cresol, and phloroglucinol.

The aldehyde deficient resin makes a chemically reactive component for an adhesive, particularly when combined with an RFL dip. Resorcinol to formaldehyde ratios employed may range from 8:1 to 1.0:0.99 and preferably are $1 + n:n$, where $n$ is an integer from 1 to 7. The resins comprise chains of aromatic groups connected by methylene linkages which are connected to carbon atoms in the benzene rings. The amount of formaldehyde employed is sufficient to provide the methylene linkages between the aromatic rings, but is insufficient to provide methylol side groups on the aromatic rings. The resins are noncuring because there are no methylol side groups on the aromatic rings and they do not cure except in the presence of external groups such as methylol groups or external formaldehyde. These resins are noncuring in the presence of heat up to at least 490° F. in the absence of methylol groups or formaldehyde. A heating time of 40 – 60 seconds at 470° – 490° F. is sufficient to wet the cord with this resin while driving off the water of the system.

The second coat of the cords as called for in this invention is made with a standard RFL (resorcinol/formaldehyde/rubber latex) adhesive dip known in the art and often used to condition nylon (polyamide) cords for adhesion to elastomer stocks. In this dip the resorcinol-formaldehyde resin may be the same aldehyde deficient resin as used in the first dip, but, if so, external formaldehyde is included to promote cure of the resins. In the usual case, the resorcinol-formaldehyde resin used in an RFL dip in the art is a resin that is prepared with a molar excess of formaldehyde over resorcinol, generally the ratio is 1.1:1.0 to 3:1, formaldehyde to resorcinol, though ratios as high as 7:1 are possible. These resins are made by alkaline catalysis as by reacting 0.2 mole of formaldehyde with 0.1 mole of resorcinol in the presence of 0.3 part sodium hydroxide in 240 parts water. After solution is effected, the reaction is carried out for 6 hours at 75° F. Such a resin then consists of aromatic rings connected by methylene groups and has side chain methylol groups on the aromatic rings through which the resin can cure when heated. These methylol groups can also cure the previously deposited noncuring resin by incorporating it into the curing resin of the second dip. The latex employed in the RFL dip as the carrier for the resin may be natural rubber latex or a synthetic material such as SBR latex. Preferably the latex contains a copolymer containing vinyl pyridine such as a styrene-butadiene-vinyl pyridine latex. The proportions of rubber latex and resorcinol-formaldehyde resin are in accordance with conventional practice. The second cord coat is heated at 460° – 490° F. for 40 – 60 seconds to dry the coat and cure the resins.

The rubber elastomer which is reinforced with polyester cord in the practice of this invention for making rubber and textile laminates for use in tire manufacture and the like may be natural rubber, or a synthetic diene rubber. Diene rubber polymers include those polymers having rubber-like properties which are prepared by polymerizing a conjugated $C_4$ to $C_8$ diolefin such as butadiene or isoprene, alone or with one or more other polymerizable ethylenically unsaturated compounds such as styrene, methyl styrene and acrylonitrile, the conjugated diolefin usually being present in the mixture to the extent of at least 40 percent of the total polymerizable material by weight, and preferably in a major proportion. Butadiene-styrene copolymers are known as SBR. Other synthetic rubbers include polychloroprenes. Isobutylene isoprene copolymer (butyl rubber) and elastomeric ethylene-propylene copolymers (EPM) and ethylene-propylene-diene polymers (EPDM) may also be used.

The rubber employed may contain customary amounts of various additives such as those needed to effect or accelerate vulcanization. Said materials include sulfur, thiuram, polysulfides, dithiocarbamates, mercaptobenzothiazoles and sulfenamides. These components are preferably employed in amounts ranging from about 0.1 part to 10 parts per 100 parts of rubber by weight. Other materials may be included in the rubber composition such as carbon black, pigments, antioxidants, and retarders, all in accordance with practices known in the art.

The coatings are preferably applied to the cords in standard dip troughs with excess dip being removed by wipers as the cord leaves the trough. Other suitable coating methods such as brushing and spraying may be used.

After each coating the cord is heated in suitable ovens to at least about 475° F. Heat fuses the resin applied in the first dip so that the cord surfaces become wetted with resin and cures the resin applied in the second dip. A temperature of at least 470° F. preferably 475° F. must be attained after the initial dip. The key is to not only melt the noncuring resin, which melts at 175° to 250° F., but also to initiate its reaction in its uncured state with the surface molecules of the textile cord. Higher temperature than about 490° F. are undesirable because of expense in attaining them and because they tend to degrade the resin and even the cord.

The fully treated tire cord is embedded in a rubber tire carcass compound and the rubber is vulcanized. Adhesion between cord and rubber is determined by the H test method, ASTM D2138–67. The test cord is molded for 35 minutes at 280° – 300° F. into an "H" block specimen of rubber stock with the cord embedded in the rubber for 0.25 inch. The pounds needed to pull the adhered cord free from the rubber is the H adhesion value. High values (22 – 30 lb. at 212° F. depending on type of compound) are desired with a minimum of 16 lbs. at 212° F. being acceptable.

EXAMPLE

A polyethylene terephthalate tire cord of 2,000 denier/2 construction having 8.4 turns per inch of ply twist and 8.4 turns per inch of cable twist is run through the following adhesive dip at a rate which submerges the cord in the dip for about 3 seconds before wipers remove the excess dip from the cord.

| Material | Parts by Weight |
| --- | --- |
| Acid catalyzed, noncuring resorcinol/formaldehyde resin, molar ratio of resorcinol to formaldehyde 2/1, 77% total solids | 5.0 |
| Sodium hydroxide, 1.5% total solids solution | 5.0 |
| Ammonia water, 28% | 4.5 |
| Water | 85.5 |

This dip mixture is stirred slowly to obtain a homogeneous material. It can be used at once or stored indefinitely. The dip is applied to the cord at room temperature and the treated cord is heated for 2 minutes at 320° F. to remove water, then at 475° F. for 1 minute to fuse the resin on the cord.

The same procedure for dipping, drying and baking is used to apply a second dip of the following composition:

| Material | Parts by Weight |
| --- | --- |
| Resorcinol | 11 |
| Formaldehyde (37%) | 16.2 |
| Sodium hydroxide | 0.3 |
| Water | 298.5 |
| Terpolymer rubbery latex of styrene/butadiene-1,3/2-vinyl pyridine, 70/20/10 (38%) | 244 |
| Ammonium hydroxide | 11.3 |

This second stage dip is prepared by adding the sodium hydroxide and the resorcinol to 238.5 parts water and dissolving completely. The formaldehyde is added and mixed for 5 minutes. This mix (a resin masterbatch) is aged 2 hours at 75° F. Molar proportion of resorcinol to formaldehyde is about 1:2 and the resin is a curing type. Next the terpolymer latex is added to 60 parts water and the resin masterbatch is carefully added and stirred 5 minutes. Ammonium hydroxide is added and the batch is stirred another 10 minutes. The dipping, drying and baking steps of the first stage dip are repeated. The amount of cured resins on the cord is determined to be 4.5 parts per 100 parts by weight of cord.

A rubber compound, typical of a pneumatic tire carcass stock, is prepared to the following recipe:

| Ingredients: | Parts by Weight |
| --- | --- |
| Natural rubber | 100 |
| Zinc oxide | 3.00 |

| | |
|---|---|
| Carbon black | 29.80 |
| Stearic acid | 2.00 |
| Pine tar | 7.00 |
| Mercaptobenzothiazole | 1.25 |
| Sulfur | 3.00 |
| Diphenylguanidine | 0.15 |
| Phenyl beta naphthylamine | 1.00 |

When the second stage dip, which is a conventional one employed for nylon cords as a single stage dip, is used as a single stage dip on the polyester cord, the highest adhesion to carcass compound obtained is only 12 lb. for a ¼ inch H sample at 212° F. The curing resin becomes cured in the drying and heating steps. It cures before wetting the cord and this does not bond tightly to the cord.

H-test evaluation of the adhesion of the double dipped polyester cord of the invention carcass stock cured 35 minutes at 280° F. with 0.25 inches of cord imbedded in the rubber is 29.7 lb. at 212° F., an entirely satisfactory value.

I claim:

1. The process of treating polyester cords for use in textile reinforced rubber products which comprises treating the cord in a first dip comprising an aqueous medium which includes a phenol/aldehyde resin which has a molar ratio of resorcinol to formaldehyde of 8:1 to 1.0:0.99, is deficient in aldehyde and is noncuring, heating the treated cord, thereby drying the said cord and fusing the said resin so that the said cord is thereby wetted and prime coated with said resin, treating the cord in a second dip comprising an aqueous medium which includes a curing resorcinol/formaldehyde resin/rubber latex composition, said rubber latex comprising a butadiene/styrene/vinyl pyridine terpolymer, said resorcinol/formaldehyde resin combined with said latex containing sufficient formaldehyde to cure said resin combined with said latex and to cure the said aldehyde deficient resin of said prime coat and heating said cord to effect the cure of said resins on said cord.

2. The process of claim 1 wherein said noncuring phenol/aldehyde resin is formed by the reaction of resorcinol and formaldehyde in the molar ratio of $n + 1$ to $n$ where $n$ is an integer from 1 through 7.

3. The process of claim 2 wherein said prime coating is heated at 475° – 490° F.

4. The process of claim 3 wherein said first dip resin is a resorcinol/formaldehyde resin wherein the molar ratio of resorcinol to formaldehyde is 2 to 1.

5. The process of treating polyester cords for use in textile reinforced rubber products which comprises treating the cord in a first dip comprising an aqueous medium which includes a phenol/aldehyde resin which has a molar ratio of resorcinol to formaldehyde of 8:1 to 1.0:0.99, is deficient in aldehyde and is noncuring, heating the treated cord, thereby drying the said cord and fusing the said resin so that the said cord is wetted thereby and prime coated with said resin, treating the cord in a second dip comprising an aqueous medium which includes a curing resorcinol/formaldehyde resin/ rubber latex composition, said rubber latex comprising a butadiene/styrene/vinyl pyridine terpolymer, heating said composition to 475° – 490° F. to cure said resorcinol/formaldehyde resin combined with said latex and said aldehyde deficient resin, said resorcinol/formaldehyde resin combined with said latex containing sufficient formaldehyde to cure said resin combined with said latex and to cure the aldehyde deficient resin of said prime coat.

6. The process of claim 5 wherein said aldehyde deficient resin is a resorcinol/formaldehyde resin wherein the molar ratio of resorcinol to formaldehyde is 2 to 1.

* * * * *